United States Patent
Joseph et al.

(10) Patent No.: US 10,834,661 B2
(45) Date of Patent: Nov. 10, 2020

(54) MULTIPLE CONNECTIVITY FOR HIGH RELIABILITY

(71) Applicant: QUALCOMM Incorporated, San Diego, CA (US)

(72) Inventors: Vinay Joseph, San Diego, CA (US); Peerapol Tinnakornsrisuphap, San Diego, CA (US); Christophe Chevallier, San Diego, CA (US); Satashu Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/373,403

(22) Filed: Apr. 2, 2019

(65) Prior Publication Data

US 2019/0335379 A1 Oct. 31, 2019

Related U.S. Application Data

(60) Provisional application No. 62/663,782, filed on Apr. 27, 2018.

(51) Int. Cl.
  *H04W 40/24* (2009.01)
  *H04W 76/11* (2018.01)
  *H04W 28/06* (2009.01)

(52) U.S. Cl.
  CPC ......... *H04W 40/248* (2013.01); *H04W 28/06* (2013.01); *H04W 40/246* (2013.01); *H04W 76/11* (2018.02)

(58) Field of Classification Search
  CPC ..... H04W 40/24; H04W 28/06; H04W 76/11; H04W 40/248; H04W 40/246
  See application file for complete search history.

(56) References Cited

U.S. PATENT DOCUMENTS

2012/0307842 A1* 12/2012 Petrov ................ H04N 21/4344
 370/474
2017/0303286 A1* 10/2017 Sang ................. H04W 72/0413
(Continued)

OTHER PUBLICATIONS

Ericsson: "URLLC for Factory Automation", 3GPP Draft; R1-1800973 Factory Automation, 3rd Generation Partnership Project (3GPP), Mobile Competence Centre ; 650, Route Des Lucioles ; F-06921 Sophia-Antipolis Cedex ; France, vol. RAN WG1, No. Vancouver, Canada; Jan. 22, 2018-Jan. 26, 2018, Jan. 13, 2018 (Jan. 13, 2018), P051385206, 3 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], sections 1 to 3.
(Continued)

*Primary Examiner* — Chi Ho A Lee
*Assistant Examiner* — Andrew Lee
(74) *Attorney, Agent, or Firm* — QUALCOMM Incorporated

(57) ABSTRACT

Various aspects and features related to wireless communication for high reliability and low latency are described. In an aspect of the disclosure, a method, a computer-readable medium, a system, and an apparatus are provided. A method of wireless communication includes communicating with a network via one or more network nodes using separate wireless links for each UE in a set of UEs using a same RAT. The method includes either transmitting uplink data traffic from a common source to the network nodes using respective separate wireless links corresponding to the two or more UEs or receiving downlink data traffic destined for the common source from the network nodes using respective separate wireless links corresponding to the two or more UE.

30 Claims, 8 Drawing Sheets

(56) References Cited

U.S. PATENT DOCUMENTS

| | | | |
|---|---|---|---|
| 2018/0027444 A1* | 1/2018 | Maria | H04W 28/0289 |
| | | | 370/235 |
| 2018/0062821 A1* | 3/2018 | Mamidwar | H04L 5/0007 |
| 2018/0098250 A1* | 4/2018 | Vrzic | H04W 36/18 |
| 2018/0368132 A1* | 12/2018 | Babaei | H04W 72/042 |
| 2018/0376457 A1* | 12/2018 | Tseng | H04L 5/0055 |
| 2019/0268799 A1* | 8/2019 | Hong | H04W 40/04 |
| 2019/0289489 A1* | 9/2019 | Yi | H04W 28/0205 |
| 2020/0007281 A1* | 1/2020 | Kilinc | H04L 5/0098 |
| 2020/0127766 A1* | 4/2020 | Jonsson | H04L 1/0001 |

OTHER PUBLICATIONS

International Search Report and Written Opinion—PCT/US2019/025741—ISA/EPO—dated Jun. 13, 2019.
Time-Sensitive Networking Task Group of IEEE 802 1 of the LAN MAN Standards Committee Of The IEEE Computer Society: "Frame Replication and Elimination for Reliability", IEEE Draft; 802-1CB-D2-9, IEEE-SaS Piscataway, NJ USA, vol. 802.1cb drafts, No. d2.9, Sep. 1, 2017 (Sep. 1, 2017), pp. 1-97, XP068120287, 97 Pages, Retrieved from the Internet: URL:grouper.ieee.org/groups/802/1/files/private/cb-drafts/d2/802-1CB-d2-9.pdf [retrieved on Sep. 1, 2017], sections 6.2, 7.1, 7.7 and 8.3.

* cited by examiner

MULTIPLE CONNECTIVITY FOR HIGH RELIABILITY

CROSS REFERENCES

The present Application for Patent claims the benefit of U.S. Provisional Patent Application No. 62/663,782 by JOSEPH, et al., entitled "MULTIPLE CONNECTIVITY FOR HIGH RELIABILITY," filed Apr. 27, 2018, which is assigned to the assignee hereof and expressly incorporated herein by reference in its entirety.

BACKGROUND

Technical Field

The present disclosure relates generally to wireless communication systems and more particularly relates to systems, methods, and devices for multiple connectivity for high reliability.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

High reliability in communications is one of the requirements in many applications and deployment configurations of wireless communication systems. Accordingly, methods and apparatus that facilitate achieving high reliability may be of benefit.

DETAILED DESCRIPTION

Figure 1:
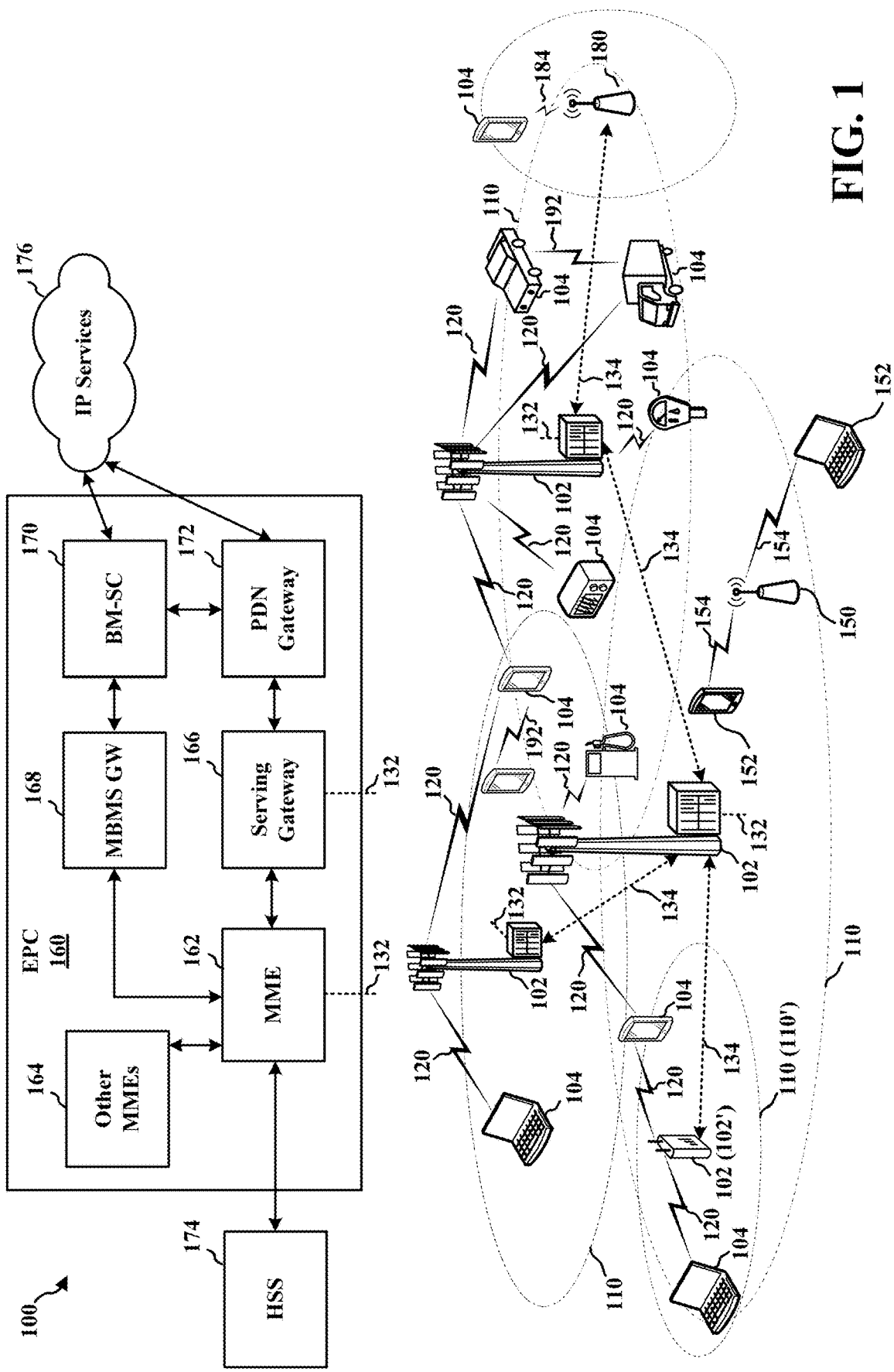
FIG. 1 is a diagram illustrating an example of a wireless communications system and an access network.

Some wireless network use cases require high reliability as well as low latency to ensure dependable and/or safe operation of important devices or systems. These use cases or service level requirements are sometimes referred to as ultra-reliable and low latency communication (URLLC). A service level may define one or more requirements for data traffic such as a packet error rate (PER), bit error rate (BER), and/or a latency requirement. URLLC service levels may guarantee PER of 10e-6 or BER of 10e-9 and latency requirements of 0.5 milliseconds (ms). URLLC has broad applications in factory automation, smart meter in smart grids, remote surgery, and many other use cases. This class of services may include applications referred to as "Mission Critical (MiCr)" services.

In order to meet these requirements, spatial diversity via more than one independent links is often useful. In some cases, spatial diversity may be achieved by a single user equipment (UE) with the capability to connect to multiple transmit reception points (TRP) simultaneously. For example, a UE supporting dual connectivity (DC) may associate with two different base stations on two different frequency carriers. As another example, a UE supporting carrier aggregation (CA) may communicate using more than one component carrier.

However multi-TRP connectivity features (e.g., DC, CA) may not be supported by all UEs. Furthermore, UEs that do support connectivity features may also include features for robust inter-TRP mobility (e.g., to perform handovers between master base stations while staying connected to a secondary base station). These additional features may lead to increased costs of a UE. Additionally, single-UE solutions, even if they do have multi-TRP connectivity features still represent a single point of failure in other ways.

In recognition of the foregoing, it may be useful to utilize systems, methods, or devices that provide URLLC requirements without a single point of failure and/or while maintaining low cost. In one embodiment, these high URLLC requirements may be met by combining multiple UEs that individually may not meet the requirements together into a single package, module, device, or system. In one embodiment, each of the multiple UEs may include a single connectivity component, such as a mobile termination (MT), for communicating using one or more radio access technologies (RATs). A connectivity component may independently only support a RAT (e.g., an existing, previous or future generation RAT) that is not able or guaranteed to meet the bit error rate or latency requirements of a specific URLLC deployment. However, with a device or system using multiple of the connectivity component, the requirements may be met using the RAT that is not able or guaranteed to meet the requirements. This can lead to lower cost and improved reliability due to the elimination of at least some single points of failure that may be present in UEs or devices with a single connectivity component, even if that single connectivity component is using a RAT that, on its own, can meet the requirements.

In one embodiment, a method for reliable or low latency wireless communication may include communicating, by each connectivity component in a set of connectivity components, with a network via one or more network nodes using separate wireless links for each connectivity component. Each connectivity component in the set of connectivity components may use a same RAT. The RAT may include a RAT that on its own is unable to satisfy specific reliability or low latency requirements. The system may include one or more of transmitting uplink data traffic or receiving downlink data traffic. If transmitting, the method may include transmitting, by two or more connectivity components of the set of connectivity components, uplink data traffic from a common source to the network nodes using respective separate wireless links corresponding to the two or more connectivity components. Duplicate data of the uplink data traffic is transmitted to the network using the respective separate wireless links. If receiving the method may include receiving, by the two or more connectivity components of the set of connectivity components, downlink data traffic destined for the common source from the network nodes using respective separate wireless links corresponding to the two or more connectivity component. The duplicate data of the downlink data traffic may be received from the network using the respective separate wireless links. The method may be performed by a system or device, such as by a multi-connectivity or multi-UE module. A multi-MT module or a multi-UE module may be types of a multi-connectivity module.

In one embodiment, a method for reliable or low latency wireless communication may include identifying, by the one or more network entities, a first connectivity component as part of a multi-connectivity module. The method includes, identifying, by the one or more network entities, a second connectivity component as part of the multi-connectivity module, wherein the multi-connectivity module communicates data between a common source and the one or more network entities. The method may include one or more of sending duplicate downlink data traffic or receiving duplicate uplink data traffic. If sending, the method may include sending, by the one or more network entities, duplicate downlink data traffic to the common source via a first wireless link corresponding to the first connectivity component and a second wireless link corresponding to the second connectivity component. If receiving, the method may include receiving, by the one or more network entities, duplicate uplink data traffic from the common source via the first wireless link corresponding to the first connectivity component and the second wireless link corresponding to the second connectivity component. The network entities may include one or more of base stations, servers, nodes, or other entities within a radio access network (RAN) and/or core network.

The previous paragraphs and description is given by way of example and introduction only. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. It should be understood that some implementations may include other core networks than the EPC 160, such as a 5G core network. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to one or more restricted groups known as closed subscriber groups (CSGs). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB) or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) and mmW spectrum are part of the radio frequencies in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base stations may include a gNB, Node B, evolved Node B (eNB), an access point, a base transceiver station, a radio base station, a radio transceiver, a transceiver function, a basic service set (BSS), an extended service set (ESS), a TRP, or the like. The base station 102 provides an access point or network node to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, factory machinery, an assembly line robot, a display, or any other device with wireless communication capability. Some of the UEs 104 may be referred to as IoT devices (e.g., parking meter, gas pump, toaster, vehicles, heart monitor, factory machinery, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Techniques referred to as coordinated multipoint (CoMP) have been developed that allow a device, e.g., a UE, to communicate with multiple TRPs in a coordinated manner and yet mitigate interference in the system. CoMP enables dynamic coordination of transmission and reception with multiple geographically separated TRPs, with the objective of enhancing the overall system performance, reduced interference, effective utilization of resources, and improved end user service quality. CoMP techniques may be broadly categorized into coordinated scheduling and coordinated beamforming (CS/CB), joint transmission (JT), and dynamic point selection (DPS). In CS/CB, multiple coordinated TRPs may share channel state information (CSI) for multiple UEs, while data packets to be conveyed to a UE are available only at one TRP. In JT, the same data may be transmitted from multiple coordinated TRPs with appropriate beamforming weights.

In certain configurations, a UE 104 may provide communication services between a source device and multiple base stations. For example, a UE 104 may communicate data between a source device (data source/data sink) to multiple base stations or TRPs. The same data, copies/duplicates of the same data, or a same payload with different headers may be sent or received by the UE 104 on behalf of the source device. The data may include user layer or control layer data. In a factory/manufacturing environment, the data may include, for example, sensor/actuator data such as a measured position, angle, temperature etc. In one embodiment, the UE 104 may include a multi-UE or multi-connectivity module with multiple UEs or multiple MTs. By using multiple connectivity components that each use a different base station 102, frequency, bandwidth part, network slice, CSG-ID, access identifier, and/or the like, to communicate duplicates of packets or data traffic between a specific device and the network, there may be a reduced risk of delay or loss of data. Various features of the methods described herein may improve resource management and spatial reuse, and facilitate achieving low latency and high reliability communications.

Figure 2:
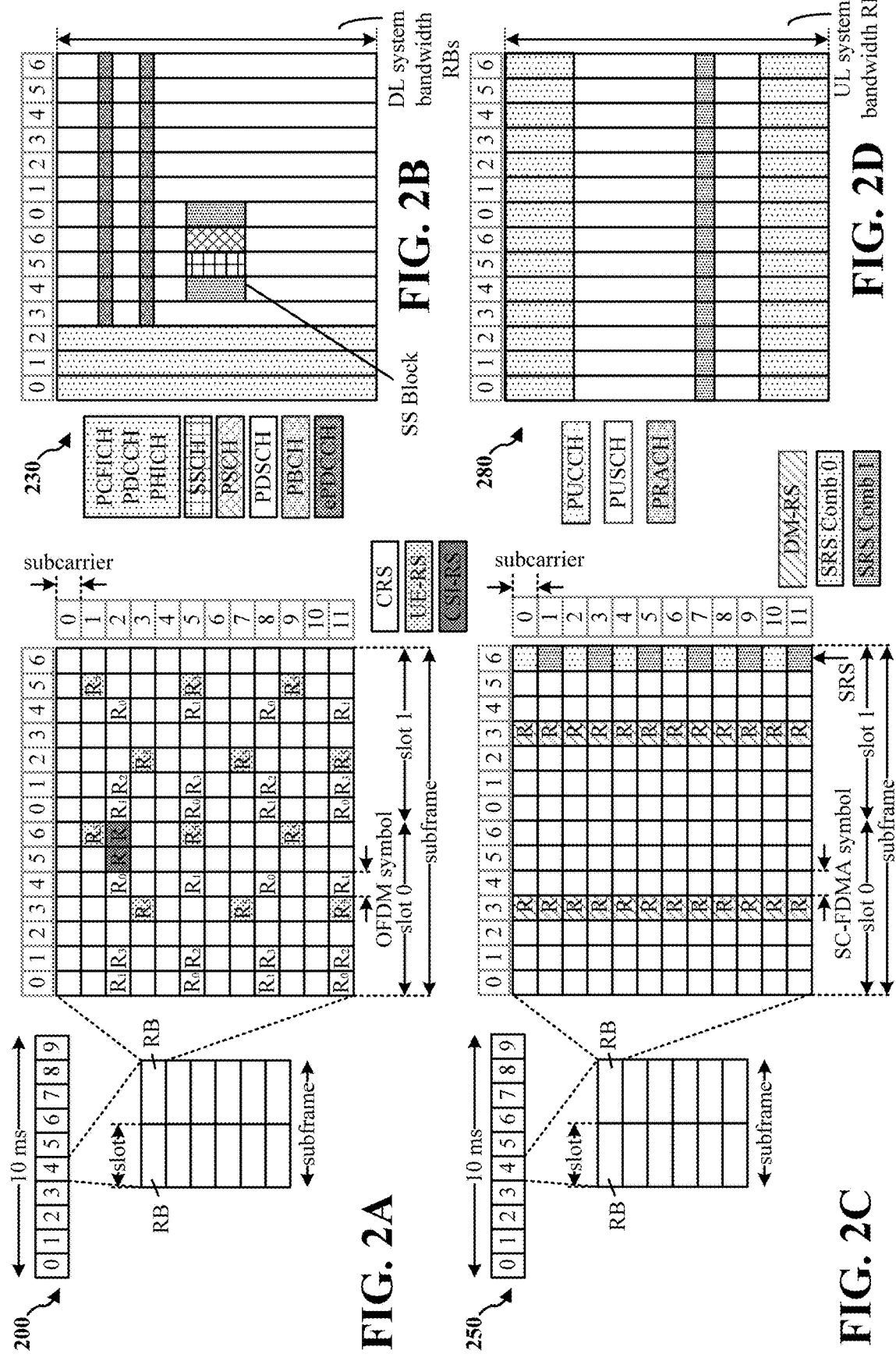
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. Although the illustrated example DL frame structure closely resembles frame structure for 3GPP 4G specifications, one of skill in the art will understand that this is given by way of illustration only. Other frame structures, such as a corresponding frame structure for 3GPP 5G or other implementations or standards are encompassed by the present disclosure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. These structures are given by way of illustration only as the structure may vary between versions and technologies. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
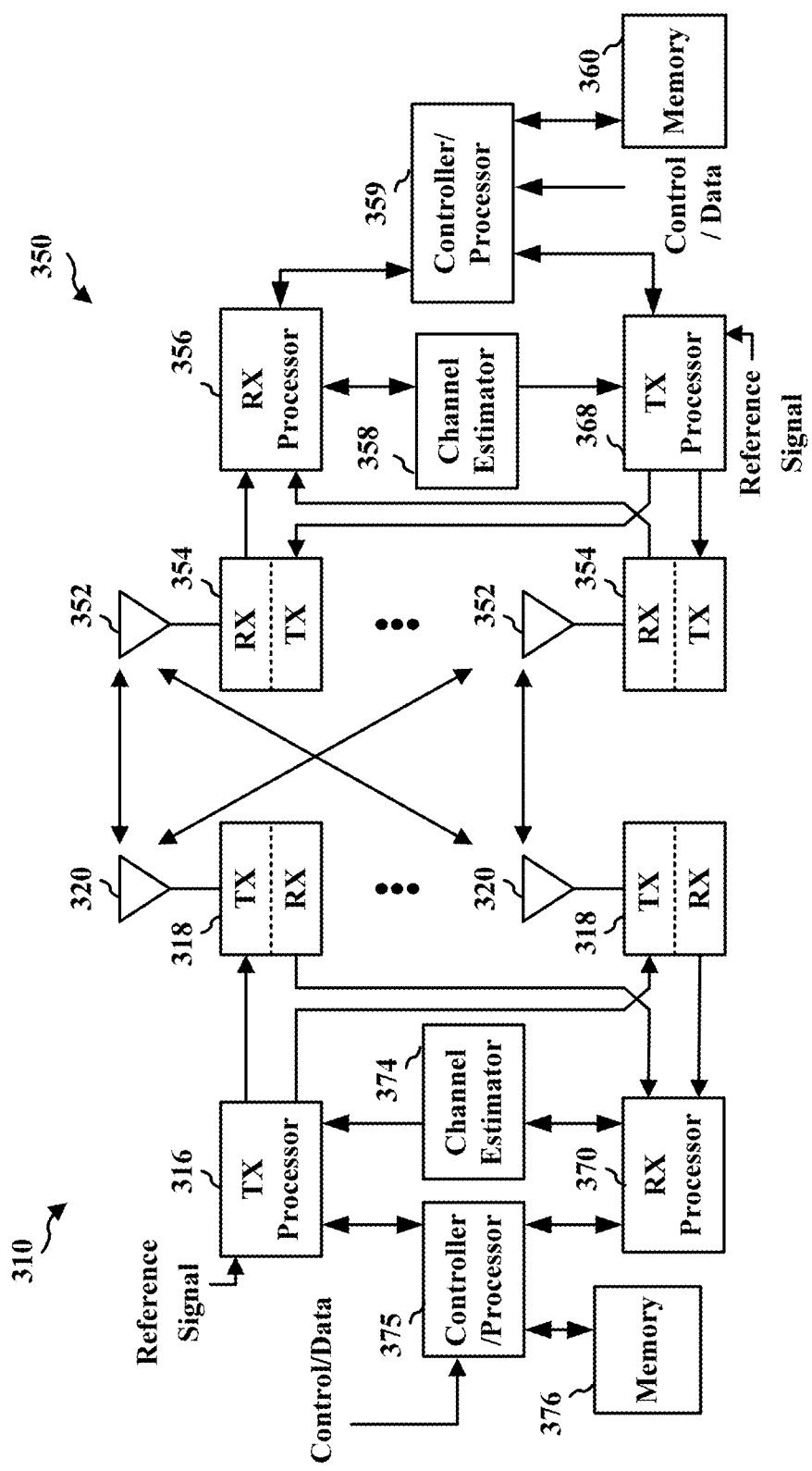
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
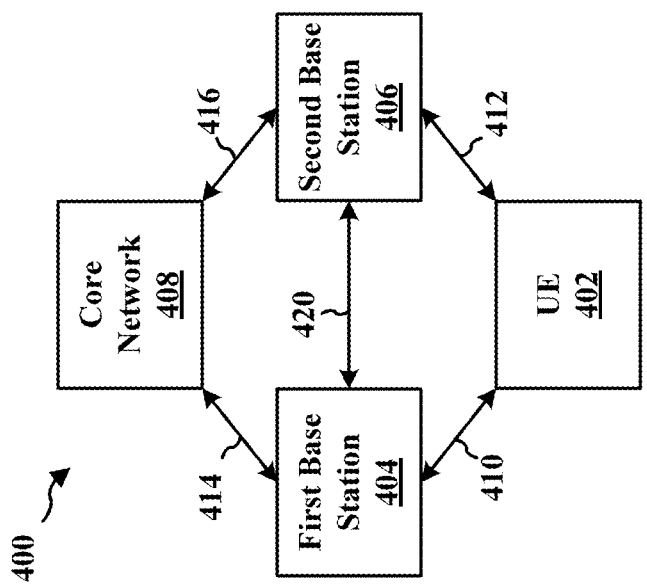
FIG. 4 is a diagram illustrating an example UE communicating data traffic via two base stations.

FIG. 4 is a diagram 400 illustrating a single UE 402 communicating duplicate data traffic via two base stations (a first base station 404 and a second base station 406) to a core network 408 or a destination via the core network 408. The UE 402 may include a UE that supports DC or CA and thus can communicate with two different base stations and/or using two different frequencies at once. The UE 402 may send uplink data via a first channel 410 to the first base station 404 and also send the uplink data via a second channel 410 to the second base station 406. For example, a first copy of data (e.g., in a payload and/or a header of a packet) may be sent on the first channel 410 while a second copy of the data is sent via the second channel 412. Thus, duplicate uplink data is sent via both the first channel 410 and the second channel 412. The separate channels 410, 412 and/or base stations 404, 406 may provide diversity to improve reliability and/or reduce latency (e.g., due to degradation of a channel). Frequency diversity, spatial, base station 404 hardware diversity, RAN to core network link diversity (e.g., via links 414 and 416) may be achieved in various embodiments. These various diversity options, alone or in combination, may help to improve the likelihood that a specific set of data will be received (e.g., on the first try or within the first N number of tries). However, in some cases, the single UE 402 may represent a single point of failure or an increased cost. For example, support of DC or CA may increase a cost of the UE.

Figure 5:
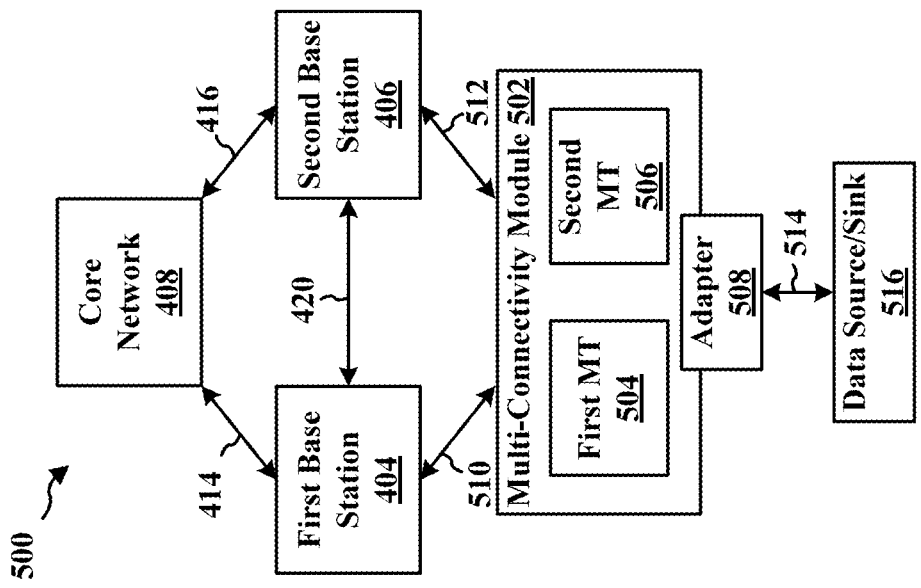
FIG. 5 is a diagram illustrating an example multi connectivity module communicating data traffic via two base stations.

FIG. 5 is a diagram 500 illustrating a multi-connectivity module 502 communicating duplicate data traffic via the two base stations (a first base station 404 and a second base station 406) to a core network 408 or a destination via the core network 408. For example, the multi-connectivity module 502 may serve a similar purpose as the UE 402 of FIG. 4 but with increased performance, availability, configurability, and/or lower cost. For example, if a single connectivity component fails, another connectivity component may be available to handle the traffic. Similarly, increased configurability may allow for the grouping of more than two connectivity components (e.g., three or more) to further improve performance (decrease latency) and improve reliability. For example, as many connectivity components as needed can be combined to reach the desired service level. Furthermore, multiple low cost connectivity components that can achieve a specific service level as part of a group, but cannot achieve a specific service level alone, may be lower cost than a single MT or UE that can reach the same service level.

The multi-connectivity module 502 includes at least two connectivity components. In the embodiment of diagram 500, the multi-connectivity module has two connectivity components including, specifically a first MT 504 and a second MT 506. In at least one embodiment, an MT is one type of a connectivity component. A connectivity component may include a device, apparatus, or circuit that provides functions necessary for the operations of protocols to establish and maintain a wireless link with a base station. For example, each connectivity component may be able to independently perform operations to establish and maintain a wireless link with the same or different base stations independent from other connectivity components. The connectivity component may perform the processing for wireless access but may not include a power amplifier or antenna, which may be separate components of a corresponding UE or multi-connectivity module. For example, an MT may receive input signals and provide output signals to an antenna module or radio frequency chain to establish or maintain communication with a network node. Other types of connectivity components may include a UE or a baseband processor, for example. In at least one embodiment, an MT includes an MT as defined in 3GPP TR 21.905 V15.0.0 "Vocabulary for 3GPP Specifications". "User Equipment (UE): Allows a user access to network services. For the purpose of 3GPP specifications the interface between the UE and the network is the radio interface. A User Equipment can be subdivided into a number of domains, the domains being separated by reference points. Currently the User Equipment is subdivided into the UICC [universal integrated circuit card] domain and the ME Domain. The ME Domain can further be subdivided into one or more Mobile Termination (MT) and Terminal Equipment (TE) components showing the connectivity between multiple functional groups." See 3GPP TR 21.905 V15.0.0. "Mobile Termination (MT): The Mobile Termination is the component of the Mobile Equipment (ME) which supports functions specific to management of the PLMN access interface (3GPP or non-3GPP). The MT is realized as a single functional entity." See 3GPP TR 21.905 V15.0.0." See 3GPP TR 21.905 V15.0.0. "3GPP System mobile termination: part of the 3GPP System Mobile Station which provides functions specific to the management of the radio interface (Um)." See 3GPP TR 21.905 V15.0.0. In other embodiments, a connectivity component may include terminal equipment. Embodiments of multi-connectivity modules 502 may include connectivity components that include one or more modems or may be included in a modem. Similarly, a connectivity component may be included in a UE. An MT, UE or other connectivity component may use a 5G based RAT, a 3G based RAT, an LTE RAT, or other wireless or cellular access technology.

A multi-connectivity module 502 may also include an adapter 508 for communicating with a data source or data sink (data source/sink) 516. The adapter 508 may include a physical adapter or a wireless transceiver for communicating bi-directional traffic between the multi-connectivity module 502 and the data source/sink 516.

The data source/sink 516 may include a single device or system that provide and receives data. For example, the data source/sink 516 may include a device or system that may benefit from an URLLC use case. For example, factory equipment or Internet-of-things (IoT) devices or systems such as machinery, monitoring equipment, sensor units, robots, robotic arms, assembly line equipment, power generation, power grid equipment, forklifts, safety equipment, security equipment, and many other high priority or mission critical technologies may benefit from having a URLLC connection. The multi-connectivity modules 502 may allow for data for such important or sensitive devices or systems to be communicated between the device or system and a remote managing system.

Data sent between the multi-connectivity module 502 and the network (e.g., base stations 404, 406 and core network 480) is duplicated and sent on both links 510-512. With regard to uplink data traffic, this may be done, for example, by detecting or creating a duplicate copy of data received from the data source/sink 516 and sending one copy via a first wireless link (i.e., link 510) to the first base station 404 and sending the other copy via a second wireless link (i.e., link 512) to the second base station 404. The base stations may include different TRPs, cells, nodes, Central Unit, Distributed Unit or the like of a eNB, gNB, or other base station. For example, each of the two base stations may be a cell associated with the same gNB operating on two different carriers. Also, the radio frequency components and antenna associated with the two base stations may be collocated or non-collocated. Upon receiving the duplicate copies (such as an original data and a copy of the original data) the base stations 404, 406 communicate the data to the core network via links 414 and 416. The core network 408 may delete duplicates and send on to a destination or send both copies on to the destination without deletion. In one embodiment, the base stations 404, 406 may coordinate selective deletion via link 420 (e.g., a backhaul link using an X1 interface) of at least one copy of duplicate data.

With regard to downlink data traffic, the core network may detect and/or creating a duplicate copy of downlink data and send one copy via the first base station 404 using a first wireless link (i.e., link 510) to the first MT 504 and send the other copy via the second base station 406 using a second wireless link (i.e., link 512) to the second MT 506. Upon receiving the duplicate copies the first MT 504 and the second MT 506 communicate the data to the data source/sink 516 via the adapter 508. The multi-connectivity module 502 may delete duplicates and send on to data source/sink 516 or send both copies on to the data source/sink 516 without deletion. In one embodiment, the multi-connectivity module 502 may delete all but one copy of duplicate data so that only a single copy of the downlink data is provided to the source/sink.

As will be discussed further, network side duplicate detection or deletion may occur at any point on the network side of the links 510, 512, such as within a RAN (e.g., in base stations 404, 406), by an entity in the core network 408, at a server, or at the destination device/system. Similarly, local duplicate detection or deletion may occur at any point on the local side of the links 510, 512, such as within the multi-connectivity module 502 or at the data source/sink 516.

Although FIG. 5 illustrates two base stations, this is illustrative only as other embodiments may include one, two, or any number of base stations to communicate with the multi-connectivity system. For example, a base station may include one or more cells or TRPs for receiving transmission for the multi-connectivity system. Additionally, the use of two MTs is also given by way of example. Any number of MTs may be used. Also, any connectivity component may be used in place of each MT. Each MT or connectivity component may be located on a different circuit, chip, or device to provide increased implementation flexibility. For example, a circuit, chip, or device that includes a connectivity component may be added, removed, or swapped without interrupting operation as long as a sufficient number of MTs or connectivity components remain functional to meet a service level requirement. Additional connectivity components may be added to increase the service requirements that can be achieved while connectivity components may be removed when a service requirement can be achieved with fewer connectivity components.

Figure 6:
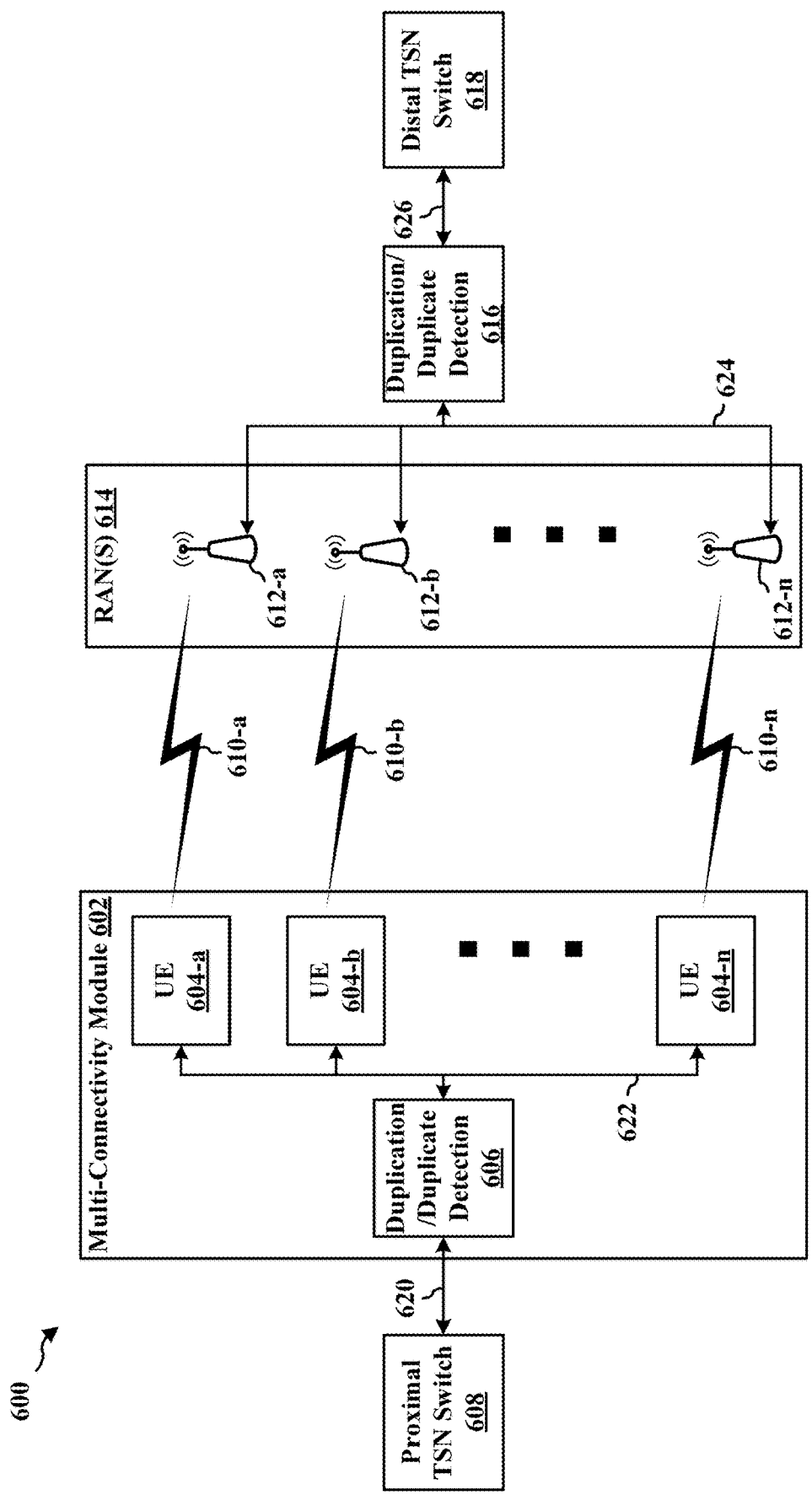
FIG. 6 is a diagram illustrating an example system for ultra-reliability and low latency communication (URLLC) including a multi-connectivity module.

FIG. 6 is a diagram illustrating a system 600 for URLLC communication including multi-connectivity module 602 having a plurality of UEs 604 and that can be used to provide communication services to a device or system. For example, the multi-connectivity module 602 may be connected to an external traffic source/sink via an ethernet adaptor and communicate with a wireless network via a plurality of access nodes or base stations of the wireless network. For clarity of discussion, components of the system 600 on the left side of wireless links 610 may be referred to as "proximal" while components on the right side of the wireless links 610 may be referred to as "distal". The wireless links 610 (or links 510 and 512) may correspond to separate logical wireless interfaces which communication according to an agreed protocol can be performed.

The multi-connectivity module 602 has a plurality of UEs including UE 604-*a*, UE 604-*b*, and UE 604-*n*. Embodiments may include any number from two or more UEs 604 or connectivity components without limitation. Each of the UEs may include at least one connectivity component or MT and attempts to maintain separate wireless channels across separate wireless links 610 with one or more RANs 614. A proximal time sensitive network (TSN) switch 608 may provide a connection to a device or system that requires or benefits from URLLC. The proximal TSN switch 608 may communicate with the multi-connectivity module 602 using an ethernet link 620 (e.g., wired or wireless).

The multi-connectivity module 602 may implement data duplication and duplicate detection 606, for example in a control unit or data processing unit. For uplink data (data moving from the proximal end of the system 600 toward the distal end) the multi-connectivity module 602 may duplicate data from a source (e.g., data received from the proximal TSN switch 608) and provide duplicates of the data via a bus 622 to one or more of the UEs 604 for transmission via one or more of the separate wireless links 610. The copies or duplicates of the data may be sent as separate packets across different wireless links. The number of duplicates or copies sent over separate links 610 may be based on a service level required by the data traffic. For downlink data (data moving from the distal end of the system 600 to the proximal end) the multi-connectivity module 602 may detect duplicate data and forward only one copy of the duplicate data to a source/sink via the proximal TSN switch 608 while deleting other copies. The copies or duplicates may be received by one or more UEs 604 via separate wireless links 610 and provide to a processing unit via a bus 622 for duplicate detection and/or deletion. Data may be duplicated and/or deleted at any point on the proximal end in different embodiments, including within the UEs 604, elsewhere in the multi-connectivity module 602, in the proximal TSN switch 608, or at the source/sink that is communication with the proximal TSN switch 608.

Separate wireless links 610 with data duplication/duplicate detection 606 may help achieve reliability and latency service levels required for a specific use case. For example, because the same data is transmitted over each wireless link 610 there is reduced likelihood that the data won't be received on the first try or within at least a specific number of retransmissions. For example, if one wireless link 610 fails, one or more other wireless links may still be able to communicate data. The use of multiple UEs 604 (and their respective connectivity components) may allow the multi-connectivity module 602 to provide a reliability and/or low latency service level not achievable by a single UE 604 of the same technology (e.g., RAT).

Each UE 604, using a respective connectivity component, establishes and maintains a wireless link 610 with one or more RANs 614. For example, the UE 604-*a* may establish or maintain a wireless link 610-*a* with a TRP 612-*a*, the UE 604-*b* may establish or maintain a wireless link 610-*b* with a TRP 612-*b*, and the UE 604-*n* may establish or maintain a wireless link 610-*n* with a TRP 612-*n*. Each TRP 612 may include a different antenna or set of antennas at different physical locations and/or orientations. Each of the TRPs 612 may be included in the same or different RANs 614. For example, a base station may include one or more TRPs and a RAN may include one or more base stations. Wireless connection with different RANs may provide an increased level of redundancy or robustness in the case of a failure of a single RAN.

TRPs 612 may implement the same or different access technologies or may be part of the same or different RANs or may operate on same or different downlink and uplink carrier frequencies. To enforce distinct connections with different TRPs or RANs, each of the UEs 604 or connectivity components may be configured with separate access classes, CSG-IDs, frequencies, or the like. The TRPs 612 or RANs may then be configured, in an example, to reject connections not matching one or more specific access classes, CSG-IDs, and/or frequencies. Thus, each wireless link 610 may provide communication using a distinct UE 604, TRP 612, RAN 614, access class, CSG-ID, and/or frequency.

The network side of the system 600 may also provide data duplication and duplicate detection 616. For downlink data (data moving from the distal end of the system 600 toward the proximal end) a network entity may duplicate data from a source (e.g., data received from the distal TSN switch 618) and provide duplicates of the data via communication links 624 to one or more of the TRPs 612 for transmission via one or more of the separate wireless links 610. The copies or duplicates of the data may be sent as separate packets across different wireless links. The number of duplicates or copies sent over separate links 610 may be based on a service level required by the data traffic. For uplink data (data moving from the proximal end of the system 600 to the distal end), a network entity may detect duplicate data and forward only one copy of the duplicate data to a destination via the distal TSN switch 618 while deleting other copies. The copies or duplicates may be received by one or more TRPs 612 via separate wireless links 610 and be provided to the network or a network entity via a communication link 624 for duplicate detection and/or deletion. Data may be duplicated or deleted at any point on the distal end in different embodiments, including within the RANs 614, a core network, in the distal TSN switch 618, or at system or device in communication with the distal TSN switch 618. Multiple devices may be connected to the TSN switches 608, 618 for communication services. Each device, system, or application running on the device or system may be provided with different service levels and therefor have a different number of duplicates created or transmitted across the wireless links 610.

Figure 7:
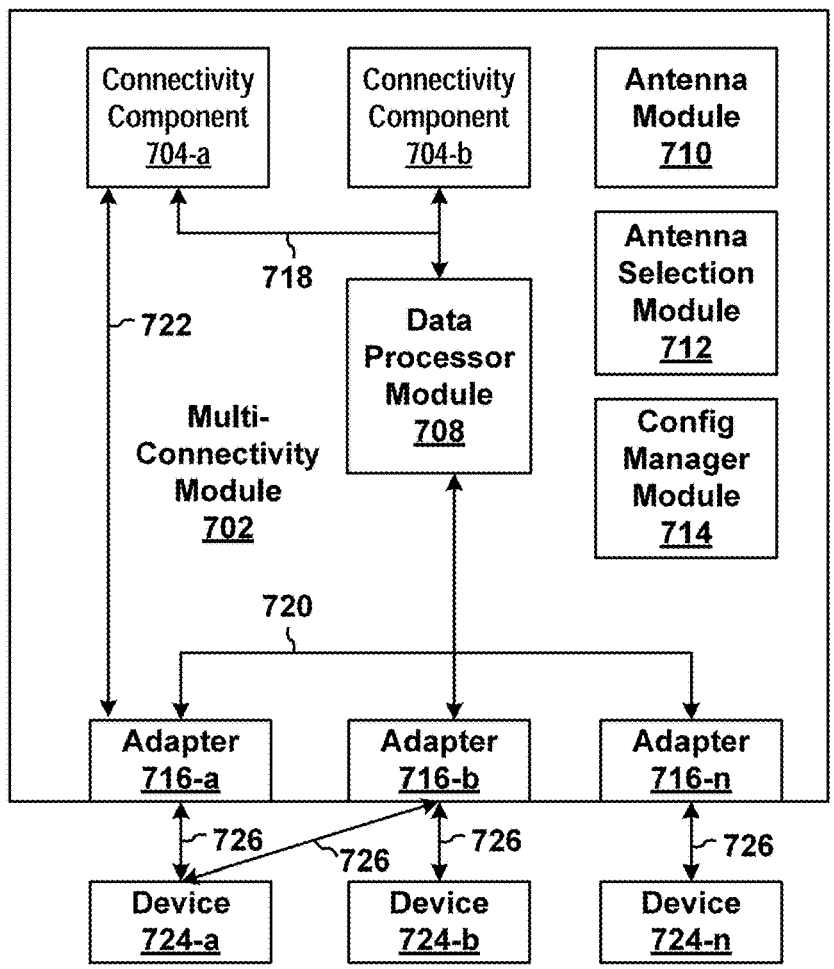
FIG. 7 is a diagram illustrating example modules or components of a multi-connectivity module.

FIG. 7 is a diagram illustrating example modules or components of a multi-connectivity module 702. The multi-connectivity module 702 may include any of the multi-connectivity modules 502, 602 of FIGS. 5 and 6. Similarly, any of the multi-connectivity modules 502 and 602 may include the components or modules of the multi-connectivity module 702 of FIG. 7. As illustrated, the multi-connectivity module 702 includes a set of connectivity components including connectivity component 704-*a* and connectivity component 704-*b*, a data processor module 708, an antenna module 710, a configuration manager module (config manager module 714), and a plurality of adapters 716. The multi-connectivity module 702 may also include a physical housing for physically housing or securing the components 704-716 as well as communication busses 718, 720, 722 for providing communication between components.

The adapters 716 may communicate with one or more devices including device 724-*a*, device 724-*b*, and device 724-*n* to provide URLLC services. The devices may include devices or systems that require or benefit from URLLC such as factory machinery, medical equipment, or other devices/systems mentioned herein.

The set of connectivity components may include two or more connectivity components. As discussed, each connectivity component may be associated with a different subscription, access class, frequency, CSG, or the like. In combination, and while using methods disclosed herein, the multi-connectivity module 702 and set of connectivity components may communicate data at a service level exceeding a service level achievable by a single connectivity component of the set of connectivity components using a RAT common to all the connectivity components.

The data processor module 708 may process uplink and downlink traffic according to principles and methods disclosed herein. The data processor module 708 may duplicate uplink data and distribute to one or more connectivity components in the set of connectivity components as well as detect duplicate downlink data and delete all but one copy of the duplicate downlink data. The data processor module 708 may route data to an adapter or connectivity component, as needed, for transmission or reception. When generating duplicate uplink data, the data processor module 708 may generate headers for duplicate packets. The headers may indicate that a packet is a duplicate while a payload of duplicate packets is identical.

The antenna module 710 may include a plurality of antennas for transmission/reception of data on behalf of the connectivity components in the set of connectivity components. The antenna selection module 712 may associate one or more antennae with each of connectivity component 704-*a* and connectivity component 704-*b* 706 based on channel measurements, diversity requirements, or the like. For example, channel quality measurements may be periodically performed for the independent links and a best or optimal association of antennas with connectivity components may be selected. The measurements may be current or instantaneous measurements or may be historical measurements obtained over time.

The config manager module 714 may manage configurations of other components of the multi-connectivity module 702. In one embodiment, the config manager module 714 may manage a configuration of each connectivity component in an connectivity component set, including associated operating frequencies for each connectivity component, a RAN node to connect to for each connectivity component, a CSG-ID for each connectivity component, an access class for each connectivity component, or the like to ensure that connectivity components don't connect to same cell or use a same frequency, access class, RAN, or the like. The config manager module 714 may initiate measurements, sending of measurement reports, declaring radio link failure, or the like. The config manager module 714 may force an connectivity component to connect to a different RAN node or to force an connectivity component to operate on a different carrier frequency. The config manager module 714 may determine which connections (e.g., Packet Data Network connections, PDU sessions described in 3GPP TS 23.501), bearers or collection of packets need packet duplication and/or which bearers or collection of packets need duplicate-packet detection. For example, the config manager module 714 may identify a quality of service (QoS) class identifier (QCI) or 5G QoS indicator (5QI) associated with a bearer corresponding to data traffic. Based on the QCI or 5QI, the config manager module 714 may associate the data traffic with specific service level requirements such as a specific latency requirement or packet error rate.

The adapters 716-a, 716-b, and 716-n may each provide communication between the multi-connectivity module 702 and external devices including device 724-a, device 724-b, and device 724-n. The adapters may include a physical ethernet port for connecting to an ethernet cable or other wired link or may include one or more wireless adapters for wirelessly communicating with the devices 724. The devices 724 may include devices that are the source for uplink data traffic and the destination for downlink data traffic. Systems may replace one or more of the devices 724 in some embodiments. Wireless or wired communication links 726 may provide communication between the adapters 716 and the devices 724. Adapters 716 may provide communication services to more than one device. For example, adapter 716-b receives data from and provides data to both device 724-a and device 724-b. Device 724-a provides data and receives data via adapter 716-a and adapter 716-b. In one embodiment, each adapter 716 may be associated with one or more connectivity components 704 in the multi-connectivity module 702. For example, adapter 716 is connected to connectivity component 704-a via a bus 722. Each of the adapters provides data to the data processor module 708 via a bus 720. The data processor module 708 may provide data to and receive data from the connectivity components 704 via a bus 718.

Each of the devices 724 may represent external traffic sources/sinks for high reliability data traffic. In one embodiment, one of the devices 724 may carry out data duplication (e.g., based on a IEEE 802.1CB standard) and send packets to different connectivity components 704 in the multi-connectivity module 702. Duplication may also take place in the connectivity components 704 and/or data processor module 708. The entity that performs duplication may information in packets (e.g., in a header) which is used by the data processor module 708 for internal routing or may send packets to an adapter 716 that corresponds to a specific connectivity component 704. Data duplication may be carried out only for packets associated with certain bearers or destination addresses. Duplication may involve creating a replica of a given UL traffic packet or creating a replica of the payload of the UL traffic packet (and adding new header). The external traffic source/sink communicating using a multi-connectivity module 702 may carry out duplicate packet detection for packets received from multi-connectivity module 702. Duplicate packet detection may involve checking whether two packets are completely identical, or just that the associated payloads are identical. Duplication detection may be performed based on the headers. For example, the data processor module 708 or a device 724 may carry out duplicate detection only for packets with certain headers (indicating that it is associated with bearers or a source using duplication) or for packets associated with specific adapters.

It may be helpful to discuss aspects of uplink and downlink packet management. Uplink and downlink traffic packets may be recognized using tags (e.g., tags within headers added to the packet inside the multi-connectivity module 702) or based on their source/destination (e.g., IP, MAC) address. For uplink packets, uplink traffic could be generated by an external entity (e.g., a device 724) or by a connectivity component 704 (or UE) in the connectivity component-set. Uplink traffic from a device may be received by the data processor module 708 via one or more adapters 716 and/or the bus 720. Uplink traffic from a UE or connectivity component 704 may be received by the bus 718. The data processor module 708 may receive an uplink traffic packet as input, carry out packet duplication and send the duplicates to one or more connectivity components 704 in the connectivity component-set. Packet duplication and extent of duplication (e.g., 2 copies or 3 copies) may be determined on a per-bearer basis, or based on the source of a packet, as configured by the configuration manager module 714. Duplication may involve creating a replica of a given uplink traffic packet or creating a replica of the payload of the uplink traffic packet and adding new header. The header used may also include a "duplication tag" and parts (e.g., a sequence number) which are also duplicated. The sequence number and duplication tag my trigger a check for a duplicate packet (e.g., same sequence number with same destination).

For downlink packets, downlink traffic received by an connectivity component 704 (or UE) in the multi-connectivity module 702 may be destined for an external traffic source/sink (e.g., one of the devices 724), or for a specific connectivity component 704 in the connectivity component-set. The data processor module 708 may receive the data via the bus 718 and route a downlink packet to an associated destination (e.g., connectivity component 704 or device 724), and may also perform duplicate-packet detection on a stream of downlink packets, and drop duplicate packets. Duplicate-packet detection may not be performed for certain bearers (with no URLLC requirements) or for packets destined to certain sources. Packet-duplicate detection may involve checking whether two packets are completely identical, or just that the associated payloads are identical, or just that a particular header (e.g., sequence number) is identical.

Similar packet duplication and duplicate detection may take place in the network (e.g., the distal side of the system 600 of FIG. 6). Packet duplication or detection may take place in a RAN, core network entity, an Internet service or even a distal source/sink with which a device 724 is communicating.

Figure 8:
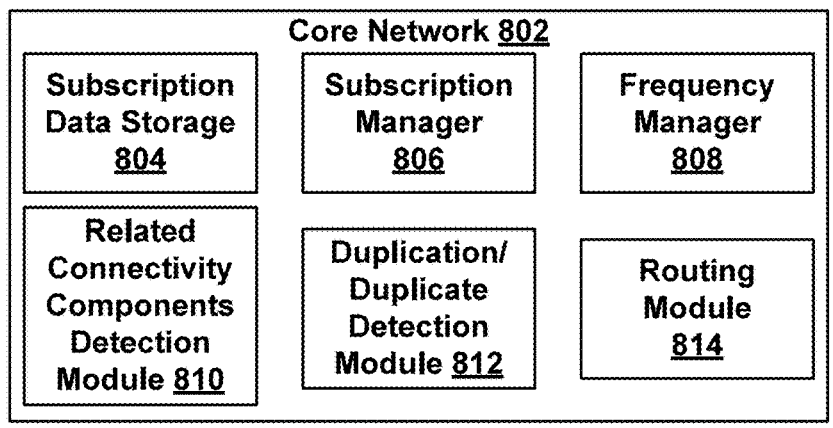
FIG. 8 is a diagram illustrating example network entities for communicating with a multi-connectivity module.

FIG. 8 illustrates network side entities 804-814 which may be included in a core network 802. The entities include a subscription data storage 804, a subscription manager 806, a frequency manager 808, a related connectivity components detection module 810, a duplication/duplication detection module 812, and a routing module 814. Although each of the entities 804-814 is illustrated within the core network other embodiments may include the entities physical or logically located or distributed across a RAN, core network 802, Internet server, or even a device or system in communication with the core network 802. In the embodiment of FIG. 6, the core network 800 would be in communication with the TRPs 612 and may implement duplication/duplicate detection 616. The distal TSN switch 618 may be located in the core network 800 or between the core network 800 and a destination server or system. FIG. 6 was a simplified figure for illustrative purposes and the entities 804-814 may be located, with respect to the system 600 of FIG. 6, on a distal side (e.g., to the right of the wireless links 610) within a core network 800, RAN, or the Internet.

The subscription data storage 804 includes computer storage media storing subscription data for one or more devices, UEs, and/or connectivity components in communication with the core network 802. The subscription data storage 804 may store subscription data including information about identifiers, subscription level, access level, device class, device capability, priority level, a multi-connectivity module identifier, or the like. Example subscription data may include a CSG-ID, access class, virtual local area network (VLAN) identifier, frequency capability, UE or MT specific identifier, classification as a member of a multi-connectivity module (e.g., multi-connectivity module 502, 602, or 702), or the like. A multi-connectivity module identifier may be an identifier (e.g., one or more bits or flags) indicating whether a connectivity component, UE, or MT is or is part of a multi-connectivity module. This information may be stored by one or more of a home subscriber server (HSS), a unified data management (UDM) function, and an authentication server function (AUSF), or other entity. The subscription data may be configured or obtain during initial access by an MT or UE, or may be configured dynamically.

The subscription manager 806 may manage the subscription information for connectivity components in a multi-connectivity module. For example, the subscription manager 806 may manage subscription information to cause the core network 802 and/or one or more RANs to enforce independent links for two or more connectivity components of a multi-connectivity module. A subscription manager may also be implemented outside the core network (e.g., using an application which has an interface to some of the subscription information in core network). A subscription manager may be implemented as an application in an Operations And Management (OAM) entity. A subscription manager may provide interfaces to configure subscriptions associated with one or more multi-connectivity modules. In some cases, independent links is needed for achieving sufficient diversity to meet URLLC requirements. In one embodiment, the subscription manager 806, may ensure that two or more connectivity components (or UEs) in a multi-connectivity module do not have a same CSG-ID, center frequency, access class, VLAN identifier, network slice identifier, and/or the like. The subscription manager 806 may also configure different cells or access nodes (e.g., a TRP or a base station) to only create connections with connectivity components having a specific set of CSG-IDs, center frequencies, access classes, network slice identifier, or VLAN identifiers. For example, by ensuring that each connectivity component has subscription information and that TRPs in the RANs require different subscription information, an connectivity component of a multi-connectivity module may be forced to connect to a RAN using a different TRP or frequency. The subscription manager 806 may send a message to a RAN or RAN node including an indication of one or more CSG-IDs, center frequencies, access classes, VLAN identifiers, network slice identifiers, or the like that the RAN or RAN node should allow or not allow to connect to the node. In one embodiment, the subscription manager 806 can be used to ensure that access class for subscriptions of one or more UEs in a multi-UE module are set in a such a way that no two UEs have the same CSG-ID in their CSG lists (e.g., CSG-IDs stored in AllowedCSGEntries and OperatorCSGEntries as defined in 3GPP TS 24.285) and so that RAN nodes may be configured as CSG nodes, and may be partitioned so that any two nodes intended to serve two connectivity components of a multi-connectivity module are configured with and broadcast different CSG-IDs. The configuration of RAN nodes may be carried out using a RAN configuration entity (e.g., an OAM entity). Thus, access class barring or extended access barring may be used to enforce the connectivity components connecting to different nodes.

The frequency manager 808 may ensure that operating frequencies of one or more of the connectivity components in a multi-connectivity module are set in a such a way that no two connectivity components operate on the same carrier frequency, BWP, etc. In one embodiment, the frequency manager 808 may use a frequency lock operation so that different frequencies are allocated to different connectivity components and/or different nodes. One or more of the frequency manager 808 or an RAN configuration entity (e.g., an OAM entity) may configure a RAN so that the RAN nodes are partitioned such that any two nodes intended to serve two connectivity components of a multi-connectivity module operate on different carrier frequencies. For example, the frequency manager 808 may send a message indicating that frequencies should be partitioned or how they should be partitions. In one embodiment, frequency manager 808 may interface with external spectrum management systems like a spectrum access system (SAS). The frequency manager 808 and/or SAS may be located in a core network 802, an Internet accessible server, a RAN, or other location.

The related connectivity components detection module 810 may detect connectivity components that are related in that they are part of a connectivity component set of a multi-connectivity module. Detection may be performed during connection establishment by an connectivity component, such as a UE. In one embodiment, the related connectivity components detection module 810 detects that a connectivity component is part of a multi-connectivity module by checking stored subscription information. For example, the related connectivity components detection module 810 may check a subscription identifier (e.g., International Mobile Subscriber Identity, Subscriber Permanent Identifier), multi-connectivity module identifier, device identifier, MAC address, or the like. The related connectivity components detection module 810 may check for matching identifiers for other connectivity components served by the core network 802 or within a geographic area. Related connectivity component detection could take place in or as part of an HSS, UDM, AUSF by checking if the identifier of any two connectivity components connected to same RAN node are same. Relatedness of connectivity components may also be based on the device or system the connectivity components are serving. For example, two MTs or UEs serving the same device or system that requires URLLC may be identified as related based on their communicating traffic with a common source address (e.g., MAC address, IP address) or common destination address (e.g., MAC address, IP address) associated with that same device or system.

If the connectivity component is part of a multi-connectivity module, the related connectivity components detection module 810 may determine whether a multi-connectivity component module has sufficient diversity (e.g., frequency, access class, network slice, serving node of a RAN, or the like). The network may inform the RAN node or multi-connectivity module to "separate" two connectivity components to provide sufficient diversity by causing the two connectivity components to use a different RAN node, frequency, or the like. In one embodiment, the related connectivity components detection module 810, frequency manager 808, or subscription manager 806 may trigger a handover or a RRC connection release (with an optional redirection to operating frequency of another connectivity component) of the connectivity component upon detection of the connectivity component as related to another connectivity component. For example, a core network entity may send a message to a RAN or RAN node triggering an RRC connection release with redirect to another node, cell, or frequency. A radio link failure (RLF) may also be declared causing an connectivity component to connect to a different node in response. Related connectivity components detection may also be performed during admission control. For example, the RAN may allow an incoming handover or RRC connection establishment or re-establishment for a connectivity component at a RAN node only if the node is not associated with any related connectivity component (e.g., not part of the same connectivity component module as another connectivity component already using the RAN node). Related connectivity component detection may also apply when handing-over UEs or connectivity components or redirecting them (e.g., for maintenance of a gNB). Similarly, mobility decisions to "separate" UEs could factor-in loading in target network element, frequency, etc.

The duplication or duplicate detection module 812 may detect duplicate packets and/or create duplicate packets. For example, the duplication or duplicate detection module 812 may perform packet duplication or detection in a similar manner discussed in relation to FIGS. 6 and 7. On the network side, however, the duplication or duplicate detection module 812 may detect uplink duplicate, dropping all but one copy of the uplink traffic, while duplicating downlink traffic for sending over independent wireless links to a multi-connectivity module. One or more network nodes (e.g., in a RAN ore core network) or network functions, such as the user plane function (UPF), may carry out the packet duplication and related routing. The duplication or duplicate detection module 812 may only monitor traffic for connectivity components identified as members of a multi-connectivity module or for specific bearers for the multi-connectivity module. For example, duplication may be performed on detecting traffic destined for any connectivity component in a connectivity component set of multi-connectivity module (e.g., based on MAC address). Duplication may involve creating a replica of a given downlink traffic packet or creating a replica of the payload of the downlink traffic packet (and adding new header). Duplication may be carried out only for a subset of bearers associated with a multi-connectivity module. After duplication, duplicated packets are routed to two or more connectivity components in a connectivity component set. When duplication for DL traffic is carried out in a core network (e.g., such as the 5G), connectivity component s in a multi-connectivity module may be assigned different VLAN-IDs to help the network to route duplicate packets to different Mts. Duplicate packet detection may be performed on detecting uplink traffic from any connectivity component in a connectivity component-set or from an address (e.g., MAC address) associated with the multi-connectivity module. Packet-duplicate detection may involve checking whether two packets are completely identical, or just that the associated payloads are identical. Packet headers may be checked or added, as discussed in relation to the multi-connectivity module, to facilitate detection of duplicate packets.

Upon creation of a duplicate for downlink packets or deletion of a duplicate for uplink packets, the routing module 814 may route the packets to an appropriate location. The routing module 814 may send duplicate downlink data traffic to a destination device (e.g., a source or sink) via multiple connectivity components. In some examples, the routing module 814 sends one packet through a first connectivity component via a first TRP and a corresponding wireless link and send a duplicate packet through a second connectivity component via a second TRP and a corresponding wireless link. The routing module 814 may drop all but one duplicate uplink packet and send the remaining uplink packet to a destination device or system, such as via the Internet. The destination device may be located behind a switch, such as the distal TSN switch 618 of FIG. 6.

The embodiments and features illustrated and discussed in the figures provide different logical or physical embodiments. These embodiments are not necessarily distinct and a feature or teaching discussed in relation to one figure may also be applied to an embodiment of another figure without limitation. Furthermore, each of the components 704-722 of the multi-connectivity module 702 of FIG. 7 and the components/entities 804-814 of FIG. 8 may include or utilize or more processors, computer readable media storing code, circuitry, or the like to perform or implement corresponding functions.

Figure 9:
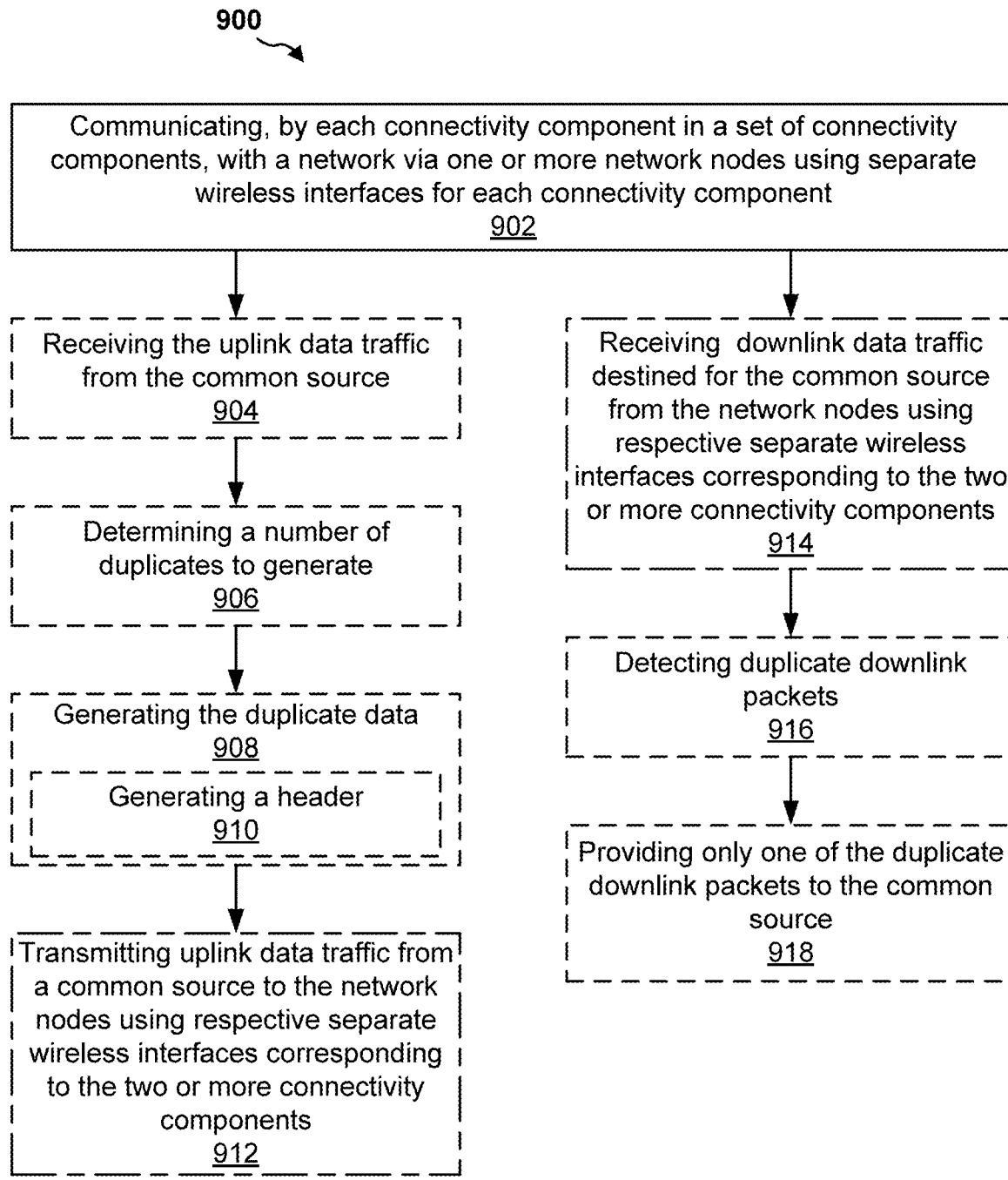
FIG. 9 is a flowchart of an example method of wireless communication.

FIG. 9 is a flowchart 900 illustrating a method of wireless communication. The method may be performed by a multi-connectivity module, such as the multi-connectivity modules 502, 602, or 702 of FIGS. 5, 6, and 7. The multi-connectivity module communicates 902 with a network via one or more network nodes using separate wireless links for each connectivity component of an connectivity component set. Each connectivity component in the set of connectivity components may use a same RAT or may have the same highest level RAT. Communicating 902 may include communication control signaling and/or establishing wireless communication with corresponding nodes. The multi-connectivity module either transmits 912 uplink data traffic or receives 914 downlink data traffic. Blocks corresponding to 912 and 914 are shown with a short-long broken line pattern to indicate that the method 900 includes one or the other, in at least some embodiments. Blocks corresponding to 904, 906, 908, 910, 916, and 918 are shown with short-short broken lines to indicate that a corresponding operation may not be present in at least one embodiment of the method 900.

If the multi-connectivity module transmits 912 uplink data traffic, the multi-connectivity module may receive 904 the uplink data traffic from a common source, such as a device or system that requires a URLLC service level. The multi-connectivity module may determine 906 a number of duplicates for the duplicate uplink data traffic to generate based on one or more service level requirements associated with a bearer corresponding to the uplink data traffic (or the common source). Determining 906 the number of duplicates may be performed as part of duplication/duplication detection 606 in FIG. 6 and/or by the data processor module 708. The multi-connectivity module may generate 908 the duplicate data, such as a duplicate packet of a received uplink packet including uplink data traffic. Generating 908 the duplicate data may include the multi connectivity component module generating 910 a header. The header may include one or more of: an address corresponding to the common source or a connectivity component of the one or more connectivity components; a field indicating that the packet is a duplicate; a field indicating that the packet is an uplink packet; and/or a sequence indicator for the packet within the uplink data traffic, wherein the sequence indicator for duplicate packets is the same. Duplicate data 908 may be generated by a device 724, the data processor module 708, or a connectivity component, such as an MT or UE.

The transmitting 912 the uplink data traffic includes transmitting, by two or more connectivity components of the set of connectivity components of the multi-connectivity module, uplink data traffic from a common source to the network nodes using respective separate wireless links corresponding to the two or more connectivity components. Duplicate data of the uplink data traffic is transmitted to the network using the respective separate wireless links. A connectivity component may cause the transmitting 912 by providing a packet or data to an antenna module 710.

If the multi-connectivity module receives 914 downlink data traffic, the multi-connectivity module may receive 914, using the two or more connectivity components of the set of connectivity components, downlink data traffic destined for the common source from the network nodes using respective separate wireless links corresponding to the two or more connectivity components. Duplicate data of the downlink data traffic is received 914 from the network using the respective separate wireless links.

The multi-connectivity module may detect 916 duplicate downlink packets including a first packet and a second packet in the duplicate data traffic directed toward the common source. The multi-connectivity module may drop all but one of the duplicate downlink packets. A data processor module 708 may detect 916 or drop duplicate packets. The multi-connectivity module may provide 918 only one of the duplicate downlink packets to the common source. E.g., the multi-connectivity module may forward only one packet of the duplicate downlink packets to an adapter corresponding to the common source while dropping all of the other duplicate downlink packets that correspond to the same downlink data. A data processor module 708 may provide 918 the one packet to a device 724 via an adapter 716.

Figure 10:
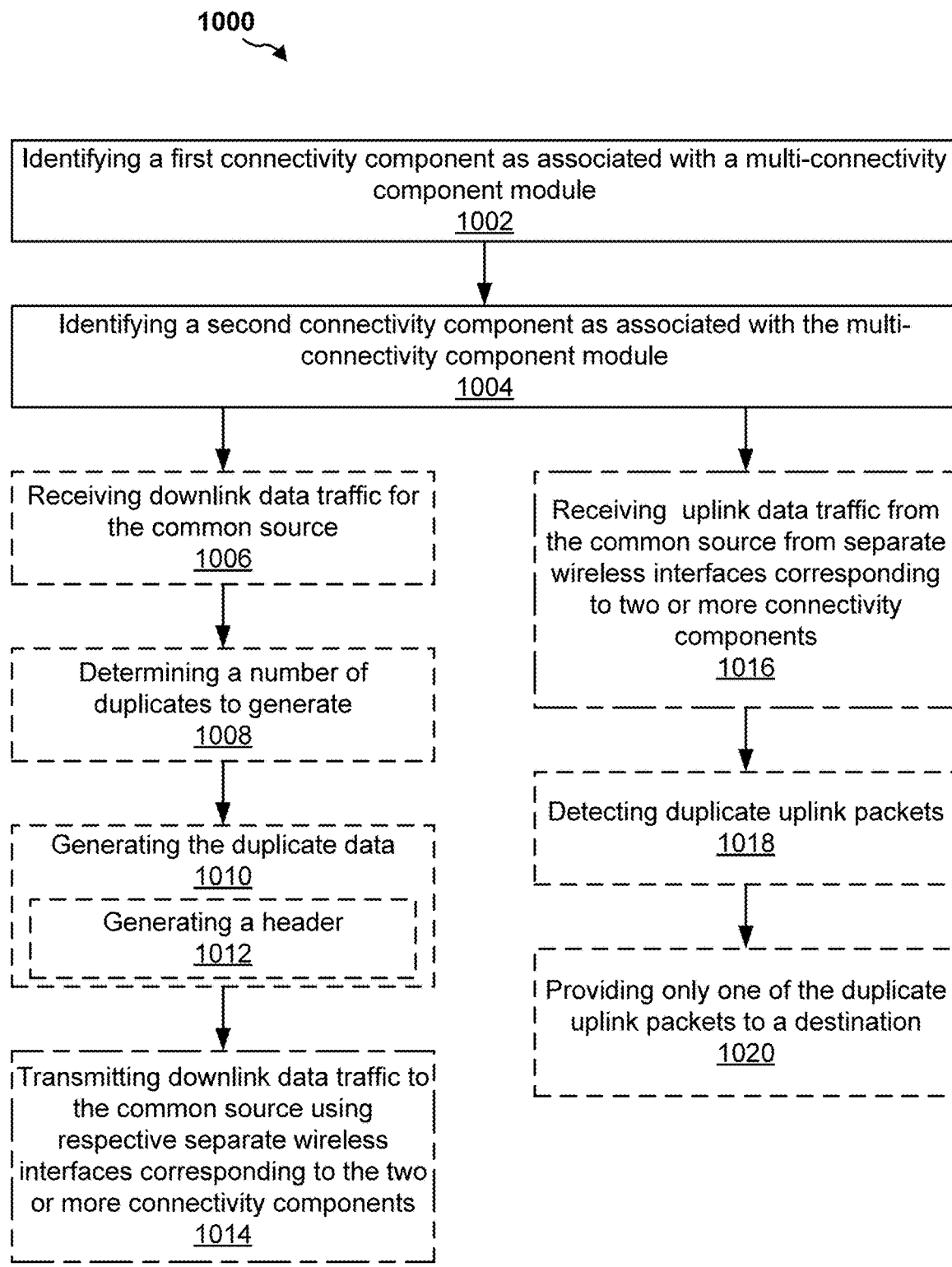
FIG. 10 is a flowchart of another example method of wireless communication.

FIG. 10 is a flowchart 1000 illustrating a method of wireless communication. The method may be performed by one or more network entities, such as computing systems or devices in a RAN, a core network, or the internet. The one or more network entities identify 1002 a first connectivity component as part of a multi-connectivity module. The one or more network entities identifying 1004 a second connectivity component as part of the multi-connectivity module. The multi-connectivity module may communicate data between a common source and the one or more network entities. The one or more network entities may either send or transmit 1014 downlink data traffic or receive 1016 uplink data traffic. Blocks corresponding to 1014 and 1016 are shown with a short-long broken line pattern to indicate that the method 1000 includes one or the other, in at least some embodiments. Blocks corresponding to 1006, 1008, 1010, 1012, 1018, and 1020 are shown with a short broken line pattern to indicate that a corresponding operation may not be present in at least one embodiment of the method 1000.

If the one or more network entities transmit 1014 downlink data traffic, the one or more entities may send or transmit 1014 duplicate downlink data traffic to the common source via a first wireless link corresponding to the first connectivity component and a second wireless link corresponding to the second connectivity component. The common source may include a device or system that requires or would benefit from a URLLC service level. The one or more network entities may determine 1008 a number of duplicates for the duplicate downlink data traffic to generate based on one or more service level requirements associated with a bearer corresponding to the downlink data traffic (or the common source). The one or more network entities may generate 1010 the duplicate data, such as a duplicate packet of a received downlink packet including downlink data traffic. Generating 1010 the duplicate data may include the one or more network entities generating 1012 a header. The header may include one or more of: an address corresponding to the common source or a connectivity component of the one or more connectivity components; a field indicating that the packet is a duplicate; a field indicating that the packet is a downlink packet; and/or a sequence indicator for the packet within the downlink data traffic, wherein the sequence indicator for duplicate packets is the same.

The transmitting 1014 the uplink data traffic includes transmitting downlink data traffic via network nodes using respective separate wireless links corresponding to the first and second connectivity component. Duplicate data of the downlink data traffic is transmitted to the network using the respective separate wireless links.

If the one or more network entities receive 1016 uplink data traffic, the one or more network entities may receive 1016, from the first and second connectivity components, uplink data traffic from the common source using respective separate wireless links. Duplicate data of the uplink data traffic is received 10156 from the connectivity components using the respective separate wireless links.

The one or more network entities may detect 1018 duplicate uplink packets including a first packet and a second packet in the duplicate data traffic from the common source. The one or more network entities may drop all but one of the duplicate uplink packets. The one or more network entities may provide 1020 or forward only one of the duplicate uplink packets to a destination. E.g., the one or more network entities may forward only one packet of the duplicate uplink packets while dropping all of the other duplicate uplink packets that correspond to the same uplink data.

EXAMPLES

The following examples pertain to further embodiments. These further embodiments and aspects of these further embodiments may be used in combination with any previous embodiments or aspects of the previous embodiments disclosed or discussed in relation to the systems, methods, or devices of the figures.

Example 1 is a method of wireless communication. The method includes communicating, by each connectivity component in a set of connectivity components, with a network via one or more network nodes using separate wireless links for each connectivity component. Each connectivity component in the set of connectivity components uses a same RAT. The method one or more of transmitting uplink data traffic or receiving downlink data traffic. The transmitting includes transmitting, by two or more connectivity components of the set of connectivity components, uplink data traffic from a common source to the network nodes using respective separate wireless links corresponding to the two or more connectivity components. Duplicate data of the uplink data traffic is transmitted to the network using the respective separate wireless links. The receiving includes receiving, by the two or more connectivity components of the set of connectivity components, downlink data traffic destined for the common source from the network nodes using respective separate wireless links corresponding to the two or more connectivity components. Duplicate data of the downlink data traffic is received from the network using the respective separate wireless links.

In Example 2, a set of UEs include the set of connectivity components of Example 1, wherein each UE of the set of UEs includes one connectivity component of the set of connectivity components.

In Example 3, the transmitting the uplink data traffic to the network or receiving the downlink data traffic from the network of any of Examples 1-2 includes communicating data at a service level exceeding a service level achievable by a single connectivity component using the RAT.

In Example 4, the service level of Example 3 includes one or more of a PER or a latency requirement not guaranteed by the RAT.

In Example 5, the RAT or connectivity component in any of Examples 3-4 does not support one or more of dual connectivity, carrier aggregation, or bandwidth parts.

In Example 6, the method of any of Examples 1-5 include the transmitting the uplink data traffic, the method further includes receiving the uplink data traffic from the common source by the two or more connectivity components of the set of connectivity components.

In Example 7, the two or more connectivity components of the set of connectivity components of Example 6 receive the data traffic from a common data source via one or more adapters, wherein the one or more adapters receive the data from the common source.

In Example 8, a multi-connectivity module includes the set of connectivity components of Example 7, the multi-connectivity module further includes one or more additional adapters for receiving data from at least one or more additional data sources.

In Example 9, the method of any of Examples 1-8 includes the transmitting the uplink data traffic. The method further includes receiving, by a data processor module, the uplink data traffic from the common source providing the duplicate data of the uplink data traffic to the two or more connectivity components of the set of connectivity components.

In Example 10, the method of Example 9 further includes generating the duplicate data of the uplink data traffic.

In Example 11, the method of Example 10 further includes determining a number of duplicates for the duplicate uplink data traffic to generate based on one or more service level requirements associated with a bearer corresponding to the uplink data traffic, wherein generating the duplicate data includes generating the number of duplicates.

In Example 12, the method of any of Examples 10-11 further includes generating a packet header for a packet of the uplink data traffic, wherein providing the duplicate data includes providing one or more of the packet header and a packet payload to at least one of the two or more connectivity components for transmission to the network.

In Example 13, the generating the header of Example 12 includes generating a header including one or more of: an address corresponding to the common source or a connectivity component of the one or more connectivity components; a field indicating that the packet is a duplicate; a field indicating that the packet is an uplink packet; and/or a sequence indicator for the packet within the uplink data traffic, wherein the sequence indicator for duplicate packets is the same.

In Example 14, the duplicate data of the uplink data traffic in any of Examples 9-13 includes duplicate uplink packets, the method further includes detecting duplicate uplink packets including a first packet and a second packet in the uplink data traffic from the common source. The providing the duplicate data includes providing the first packet to a first connectivity component of the two or more connectivity components and providing the second packet to the second connectivity component of the two or more connectivity components for transmission to the network nodes.

In Example 15, the method in any of Examples 1-14 includes the receiving the downlink data traffic, the method further including identifying the duplicate data including duplicate downlink packets.

In Example 16, the method of Example 15 further includes providing only one of the duplicate downlink packets to the common source.

In Example 17, the providing the only one of the duplicate downlink packets to the common source of Example 16 includes providing the only one of the duplicate downlink packets to an adapter corresponding to the common source.

In Example 18, the method of any of Examples 16-17 further includes identifying the duplicate downlink packets based on one or more of: an address corresponding to the common source or a connectivity component of the one or more connectivity components; a field indicating that the packet is a duplicate; a field indicating that the packet is an uplink or a downlink packet; and/or a sequence indicator for the packet within the downlink data traffic.

In Example 19, the method of any of Examples 1-18 further includes determining an operating frequency for use by a connectivity component, wherein different connectivity components of the set of connectivity components use different operating frequencies.

In Example 20, the method of any of Examples 1-19 further includes determining a network node to be used or not to be used by a connectivity component, wherein different connectivity components of the set of connectivity components use different network nodes.

In Example 21, the method of any of Examples 1-20 further includes declaring a RLF for a specific connectivity component of the set of connectivity components, wherein the specific connectivity component is forced to connect to a network node different from network nodes that other connectivity components in the set of connectivity components are connected to.

In Example 22, the method of any of Examples 1-21 further includes identifying a bearer corresponding to the common source.

In Example 23, a number of duplicates of the uplink data traffic of Example 22 includes is based on one of more of the service level requirements associated with the bearer.

In Example 24, the method of any of Examples 1-23 further includes determining whether to detect duplicate downlink packets based on the bearer.

In Example 25, the duplicate data of the data traffic of any of Examples 1-24 is received from the common source.

In Example 26, the method of any of Examples 1-25 further includes measuring channel quality using one or more antennas shared by the set of connectivity components.

In Example 27, the method of any of Examples 1-26 further includes selecting one or more antennas to be used for a transmission corresponding to a connectivity component in the set of connectivity components based on one or more of channel measurements or diversity requirements.

In Example 28, each connectivity component in the set of connectivity components in any of Examples 1-27 communicates with the network using a different network node of the one or more network nodes.

In Example 29, each connectivity component in the set of connectivity components in any of Examples 1-28 communicates with the network using a different frequency of one or more frequency bands.

In Example 30, each connectivity component in the set of connectivity components in any of Examples 1-29 communicates with the network using a different bandwidth part of one or more frequency bands.

In Example 31, the method of any of Examples 1-30 further includes using a frequency lock operation to bar a connectivity component from using a specific frequency carrier or bandwidth part.

In Example 32, each connectivity component in the set of connectivity components in any of Examples 1-31 is assigned a different access class identifier from a set of access class identifiers for communicating with the network.

In Example 33, each connectivity component in the set of connectivity components in any of Examples 1-32 uses a different closed subscriber group (CSG) identity (CSG-ID) from a set of CSG-IDs and each of the one or more network nodes are assigned one CSG-ID from the set of CSG-IDs.

In Example 34, each connectivity component in the set of connectivity components in any of Examples 1-33 uses a different slice identifier from a set of slice identifiers and each of the one or more network nodes are assigned one slice identifier from the set of slice identifiers.

Example 35 is a method for wireless communication that includes identifying, by the one or more network entities, a first connectivity component as part of a multi-connectivity module. The method also includes identifying, by the one or more network entities, a second connectivity component as part of the multi-connectivity module, wherein the multi-connectivity module communicates data between a common source and the one or more network entities. The method includes sending downlink data traffic or receiving uplink data traffic. The sending includes sending, by the one or more network entities, duplicate downlink data traffic to the common source via a first wireless link corresponding to the first connectivity component and a second wireless link corresponding to the second connectivity component. The receiving includes receiving, by the one or more network entities, duplicate uplink data traffic from the common source via the first wireless link corresponding to the first connectivity component and the second wireless link corresponding to the second connectivity component. The network entities may include core network entities RAN entities (e.g., base stations or TRPs) or the like.

In Example 36, the multi-connectivity module of Example 35 includes a plurality of UEs each including at least a single connectivity component, the plurality of UEs including a first UE including the first connectivity component and a second UE including the second connectivity component.

In Example 37, the identifying the first connectivity component or the second connectivity component as part of a multi-connectivity module in any of Examples 35-36 includes determining that a connectivity component module is part of a multi-connectivity module based on an identifier within subscription information corresponding to the first connectivity component or the second connectivity component.

In Example 38, the subscription information of Example 37 includes subscription information stored by one or more of a HSS, a UDM function, and/or an AUSF.

In Example 39, the determining that the multi-connectivity module is part of a multi-connectivity module in any of Examples 37-38 includes determining based on an identifier for the first connectivity component matching an identifier for the second connectivity component.

In Example 40, the method of any of Examples 35-39 includes the sending the duplicate downlink data traffic. The method further includes receiving a first packet of downlink data directed to the first connectivity component, the second connectivity component, the multi-connectivity module, or the common source. The method includes duplicating the first packet of downlink data to generate a second packet of downlink data. Sending the duplicate downlink data traffic to the common source includes sending the first packet of downlink data to the first connectivity component and sending the second packet of downlink data to the second connectivity component.

In Example 41, the first packet of downlink data of Example 40 includes a packet header and a packet payload, and wherein duplicating the first packet to generate the second packet includes creating the second packet with a new packet header and a duplicate packet payload.

In Example 42, the duplicating the first packet to generate the second packet in any of Examples 40-41 includes creating the new packet header including one or more of: an address corresponding to the common source, the first connectivity component, or the second connectivity component; a field indicating that the packet is a duplicate; a field indicating that the packet is a downlink packet; and/or a sequence indicator, wherein the sequence indicator for duplicate packets is the same.

In Example 43, the duplicating the first packet in any of Examples 40-42 includes generating one or more duplicates of the first packet, wherein a number of duplicates of the first packet is based on one or more service level requirements associated with a bearer for the common source.

In Example 44, the method of any of Examples 35-43 further includes detecting duplicate uplink packets in the duplicate uplink data traffic from the common source and deleting all but one packet of the duplicate uplink packets.

In Example 45, the method of Example 44 further includes detecting the duplicate uplink packets based on one or more of a source connectivity component identifier, a packet header, or a packet payload.

In Example 46, the method of any of Examples 35-45 further includes: determining whether the first connectivity component and the second connectivity component use a common access node of the network or whether the first connectivity component and the second connectivity component use a common access node after a mobility procedure for one of the first connectivity component and second connectivity component; and causing at least one of the first connectivity component and the second connectivity component to connect with the network using a different access node.

In Example 47, the causing the at least one of the first connectivity component and the second connectivity component to connect with the network using a different access node of Example 46 includes one or more of: triggering a handover; sending a RRC connection release with redirect message to another frequency or node; denying a mobility procedure; and/or determining a target node for a mobility procedure based on resource loading of nodes.

In Example 48, the method of any of Examples 35-47 includes: determining whether the first connectivity component and the second connectivity component use a same carrier frequency; and causing at least one of the first connectivity component and the second connectivity component to communicate with the network using a different carrier frequency.

In Example 49, the causing at least one of the first connectivity component and the second connectivity component to communicate with the network using a different carrier frequency of Example 48 includes one or more of a frequency lock operation or using a SAS.

In Example 50, the method of any of Examples 35-49 further includes configuring subscription information in network of different connectivity components that are part of a multi-connectivity module with different CSG-IDs from a set of CSG-IDs and configuring different access nodes in the network with one or more CSG-IDs from set of CSG-IDs.

In Example 51, the method of any of Examples 35-50 further includes configuring subscription information in network of different UEs that are part of a multi-connectivity module with different access class identifiers from a set of access class identifiers and configuring different access nodes in the network to only allow access for devices associated with one access class from the set of access class identifiers.

In Example 52, the method of any of Examples 35-51 further includes configuring subscription information in network of different UEs that are part of a multi-connectivity module with different slice identifiers from a set of slice identifiers and configuring different access nodes in the network to only allow access for devices associated with one slice identifier from the set of slice identifiers.

In Example 53, the method of any of Examples 35-52 further includes identifying a set of operating frequencies for connectivity components that are part of a multi-connectivity module and configuring different access nodes in the network to operate on one or more of the set of operating frequencies.

In Example 54, the method of any of Examples 35-53 further includes assigning the first connectivity component and the second connectivity component different VLAN identifiers, wherein sending the duplicate downlink data to the common source includes sending using the different VLAN identifiers.

Example 55 is a non-transitory computer readable medium storing instructions executable by one or more processors to cause the one or more processors to implement a method as in any of examples 1-54.

Example 56 is a system including one or more processors and memory in electronic communication with the one or more processors storing instructions executable by the one or more processors to cause the system or apparatus to implement a method as in any of examples 1-54.

Example 57 is a system or apparatus including means for implementing a method or realizing a system or apparatus as in any of examples 1-56.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication comprising:
communicating, by each connectivity component in a set of connectivity components, with a network via one or more network nodes using separate wireless links for each connectivity component, wherein each connectivity component in the set of connectivity components uses a same radio access technology (RAT), and wherein each connectivity component in the set of connectivity components comprises a mobile termination (MT); and
one or more of:
transmitting, by two or more connectivity components of the set of connectivity components, uplink data traffic from a common source to the network nodes using respective separate wireless links corresponding to the two or more connectivity components, wherein duplicate data of the uplink data traffic is transmitted to the network using the respective separate wireless links; or
receiving, by the two or more connectivity components of the set of connectivity components, downlink data traffic destined for the common source from the network nodes using respective separate wireless links corresponding to the two or more connectivity component, wherein duplicate data of the downlink data traffic is received from the network using the respective separate wireless links.

2. The method of claim 1, wherein a set of user equipments (UEs) comprise the set of connectivity components, wherein each UE of the set of UEs comprises one connectivity component of the set of connectivity components.

3. The method of claim 1, comprising the transmitting the uplink data, the method further comprising receiving the uplink data traffic from the common source by the two or more connectivity components of the set of connectivity components.

4. The method of claim 3, wherein the two or more connectivity components of the set of connectivity components receive the data traffic from a common data source via one or more adapters.

5. The method of claim 1, comprising the transmitting the uplink data traffic, the method further comprising:
receiving the uplink data traffic from the common source; and
providing the duplicate data of the uplink data traffic to the two or more connectivity components of the set of connectivity components.

6. The method of claim 5, further comprising generating a packet header for a packet of the uplink data traffic, wherein providing the duplicate data comprises providing one or more of the packet header and a packet payload to at least one of the two or more connectivity components for transmission to the network.

7. The method of claim 6, wherein generating the header comprises generating a header comprising one or more of:
an address corresponding to the common source or a connectivity component of the one or more connectivity components;
a field indicating that the packet is a duplicate;
a field indicating that the packet is an uplink packet; or
a sequence indicator for the packet within the uplink data traffic, wherein the sequence indicator for duplicate packets is the same.

8. The method of claim 6, wherein the duplicate data of the uplink data traffic comprises duplicate uplink packets, the method further comprising:
detecting duplicate uplink packets comprising a first packet and a second packet in the uplink data traffic from the common source, wherein providing the duplicate data comprises providing the first packet to a first connectivity component of the two or more connectivity components and providing the second packet to the second connectivity component of the two or more connectivity components for transmission to the network nodes.

9. The method of claim 1, comprising the receiving the downlink data traffic, the method further comprising identifying the duplicate data comprising duplicate downlink packets.

10. The method of claim 9, comprising identifying the duplicate downlink packets based on one or more of: an address corresponding to the common source or a connectivity component of the one or more connectivity components; a field indicating that the packet is a duplicate; a field indicating that the packet is an uplink or a downlink packet; or a sequence indicator for the packet within the downlink data traffic.

11. The method of claim 1, wherein each connectivity component in the set of connectivity components communicates with the network using one or more of:
a different network node of the one or more network nodes; or a different frequency of one or more frequency bands.

12. The method of claim 1, wherein each connectivity component in the set of connectivity components is assigned a different access class identifier from a set of access class identifiers for communicating with the network.

13. An apparatus for wireless communication comprising:
a processor,
memory in electronic communication with the processor; and
instructions stored in the memory and executable by the processor to cause the apparatus to:
transmit, by two or more user equipments (UEs) of a set of UEs, uplink data traffic from a common source to the network nodes using respective separate wireless links corresponding to the two or more UEs, wherein duplicate data of the uplink data traffic is transmitted to the network using the respective separate wireless links; or
receive, by the two or more UEs of the set of UEs, downlink data traffic destined for the common source from the network nodes using respective separate wireless links corresponding to the two or more UEs, wherein duplicate data of the downlink data traffic is received from the network using the respective separate wireless links;
wherein the apparatus comprises the set of UEs comprising the two or more UEs, wherein each UE in the set of UEs uses a same radio access technology (RAT).

14. The apparatus of claim 13, wherein each of the set of UEs comprises a mobile termination (MT).

15. The apparatus of claim 13, wherein the one or more UEs are configured to transmit the uplink data traffic, the apparatus further comprising one or more adapters for receiving the uplink data traffic from the common source by the two or more UEs of the set of UEs.

16. The apparatus of claim 15, further comprising one or more additional adapters for receiving data from at least one or more additional data sources.

17. The apparatus of claim 13, wherein the one or more UEs are configured to transmit the uplink data traffic, wherein the instructions further cause the apparatus to receive the uplink data traffic from the common source and provide the duplicate data of the uplink data traffic to the two or more UEs of the set of UEs.

18. The apparatus of claim 17, wherein the instructions further cause the apparatus to generate a packet header for a packet of the uplink data traffic, wherein providing the duplicate data comprises providing one or more of the packet header and a packet payload to at least one of the two or more UEs for transmission to the network.

19. The apparatus of claim 18, wherein generating the header comprises generating a header comprising one or more of:
an address corresponding to the common source or a UE of the one or more UEs;
a field indicating that the packet is a duplicate;
a field indicating that the packet is an uplink packet; or a sequence indicator for the packet within the uplink data traffic, wherein the sequence indicator for duplicate packets is the same.

20. The apparatus of claim 17, wherein the duplicate data of the uplink data traffic comprises duplicate uplink packets, wherein the instructions further cause the apparatus to:
detect duplicate uplink packets comprising a first packet and a second packet in the uplink data traffic from the common source, wherein providing the duplicate data comprises providing the first packet to a first UE of the two or more UEs and providing the second packet to the second UE of the two or more UEs for transmission to the network nodes.

21. The apparatus of claim 13, wherein the one or more UEs are configured to receive the downlink data traffic, wherein the instructions cause the apparatus to identify the duplicate data comprising duplicate downlink packets.

22. The apparatus of claim 21, wherein the instructions cause the apparatus to identify the duplicate downlink packets based on one or more of: an address corresponding to the common source or a UE of the one or more UEs; a field indicating that the packet is a duplicate; a field indicating that the packet is an uplink or a downlink packet; or a sequence indicator for the packet within the downlink data traffic.

23. The apparatus of claim 13, wherein the instructions further cause the apparatus to declare a radio link failure (RLF) for a specific UE of the set of UEs, wherein the RLF causes the specific UE to connect to a network node different from network nodes that other UEs in the set of UEs are connected to in response to the RLF.

24. The apparatus of claim 13, wherein the instructions further cause the apparatus to cause each UE in the set of UEs to communicate with the network using a different network node of the one or more network nodes.

25. The apparatus of claim 13, wherein the instructions further cause each of the UEs in the set of UEs to communicate with the network using one or more of:
a different frequency of one or more frequency bands;
a different bandwidth part of one or more frequency bands; or a different access class identifier from a set of access class identifiers for communicating with the network.

26. An apparatus for of wireless communication comprising:
a first means and a second means for communicating with a network via one or more network nodes using separate wireless links for each of the first means and the second means, wherein each of the first means and the second means uses a same radio access technology (RAT); and
means for causing the apparatus to one or more of:
transmit uplink data traffic from a common source to the network nodes using respective separate wireless links corresponding to the first means and the second means, wherein duplicate data of the uplink data traffic is transmitted to the network using the respective separate wireless links; or
receive downlink data traffic destined for the common source from the network nodes using respective separate wireless links corresponding to the first means and the second means, wherein duplicate data of the downlink data traffic is received from the network using the respective separate wireless links.

27. A method for wireless communication comprising:
identifying, by the one or more network entities, a first user equipment (UE) as part of a multi-connectivity module;
identifying, by the one or more network entities, a second UE as part of the multi- connectivity module, wherein the multi-connectivity module communicates data between a common source and the one or more network entities; and
one or more of:
sending, by the one or more network entities, duplicate downlink data traffic to the common source via a first wireless link corresponding to the first UE and a second wireless link corresponding to the second UE; or
receiving, by the one or more network entities, duplicate uplink data traffic from the common source via the first wireless link corresponding to the first UE and the second wireless link corresponding to the second UE.

28. The method of claim 27, wherein identifying the first UE or the second UE as part of a multi-connectivity module comprises determining that the multi-connectivity module is part of a multi-connectivity module based on an identifier within subscription information corresponding to the first UE or the second UE.

29. The method of claim 27, comprising the sending the duplicate downlink data traffic, the method further comprising:
receiving a first packet of downlink data directed to the first UE, the second UE, the multi-connectivity module, or the common source; and
duplicating the first packet of downlink data to generate a second packet of downlink data;
wherein sending the duplicate downlink data traffic to the common source comprises sending the first packet of downlink data to the first UE and sending the second packet of downlink data to the second UE.

30. The method of claim 29, wherein duplicating the first packet to generate the second packet further comprises creating the new packet header comprising one or more of:
an address corresponding to the common source, the first UE, or the second UE;
a field indicating that the packet is a duplicate;
a field indicating that the packet is a downlink packet; or
a sequence indicator, wherein the sequence indicator for duplicate packets is the same.

* * * * *